(12) United States Patent
Nakamura et al.

(10) Patent No.: US 10,365,538 B2
(45) Date of Patent: Jul. 30, 2019

(54) QUANTUM COMPUTER AND QUANTUM COMPUTING METHOD

(71) Applicant: KABUSHIKI KAISHA TOSHIBA, Tokyo (JP)

(72) Inventors: Satoshi Nakamura, Tokyo (JP); Kouichi Ichimura, Kanagawa (JP); Hayato Goto, Kanagawa (JP); Mamiko Kujiraoka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 448 days.

(21) Appl. No.: 15/177,725

(22) Filed: Jun. 9, 2016

(65) Prior Publication Data

US 2017/0059964 A1 Mar. 2, 2017

(30) Foreign Application Priority Data

Jun. 11, 2015 (JP) .................. 2015-118402

(51) Int. Cl.
*G02F 3/00* (2006.01)
*G06N 10/00* (2019.01)
*B82Y 10/00* (2011.01)

(52) U.S. Cl.
CPC .............. *G02F 3/00* (2013.01); *G06N 10/00* (2019.01); *B82Y 10/00* (2013.01); *G02F 2203/15* (2013.01); *Y10S 977/933* (2013.01)

(58) Field of Classification Search
CPC ....... G02F 3/00; G02F 2203/15; G06N 10/00; Y10S 977/933
See application file for complete search history.

(56) References Cited

U.S. PATENT DOCUMENTS 6,800,837 B1  10/2004  Ichimura et al.
2009/0030962 A1* 1/2009  Goto ............... B82Y 10/00
                                                             708/493

(Continued)

FOREIGN PATENT DOCUMENTS

JP  2001-209083  8/2001
JP  2015-135377  7/2015

(Continued)

OTHER PUBLICATIONS

Ichimura, K., "A simple frequency-domain quantum computer with ions in a crystal coupled to a cavity mode", Optics Communications, vol. 196, Issues 1-6, pp. 119-125 (2001).

*Primary Examiner* — Matthew L Reames
(74) *Attorney, Agent, or Firm* — Finnegan, Henderson, Farabow, Garrett & Dunner, L.L.P.

(57) ABSTRACT

According to an embodiment, a quantum computer includes first physical systems provided in a cavity, a second physical system provided in the cavity, and a light source unit. The first physical systems include a transition coupled to a common cavity mode of the cavity. The second physical system includes a first transition coupled to the common cavity mode and a second transition. The light source unit generates a first and a second light beam to manipulate two of the first physical systems and generates a third light beam that resonates with the second transition. The third light beam is radiated to the second physical system during a period when the first and the second light beam are simultaneously radiated to the two first physical systems.

7 Claims, 5 Drawing Sheets

(56) References Cited

U.S. PATENT DOCUMENTS

2010/0088488 A1* 4/2010 Ichimura ............... B82Y 10/00
712/1
2012/0170091 A1 7/2012 Goto et al.

FOREIGN PATENT DOCUMENTS

| WO | WO 2011/036814 A1 | 3/2011 |
| WO | WO 2015/107779 A1 | 7/2015 |

* cited by examiner

QUANTUM COMPUTER AND QUANTUM COMPUTING METHOD

CROSS-REFERENCE TO RELATED APPLICATIONS

This application is based upon and claims the benefit of priority from Japanese Patent Application No. 2015-118402, filed Jun. 11, 2015, the entire contents of which are incorporated herein by reference.

FIELD

Embodiments described herein relate generally to a quantum computer that utilizes coupling between a cavity and a physical system.

BACKGROUND

Quantum computers which perform computations using a quantum-mechanical superposition state have been actively studied. As one of methods/configurations for quantum computations, a frequency domain quantum computation is known in which quantum bits (qubits) used for computations are distinguished from one another in a frequency domain. In frequency domain quantum computations, the qubits are distinguished regardless of their positions, and thus, a gate error may occur due to application of operation light with detuning to qubits that are not intended to be manipulated. There has been a demand to suppress the gate error resulting from such a crosstalk, while allowing efficient performance of a quantum gate based on frequency domain quantum computations.

DETAILED DESCRIPTION

Figure 1:
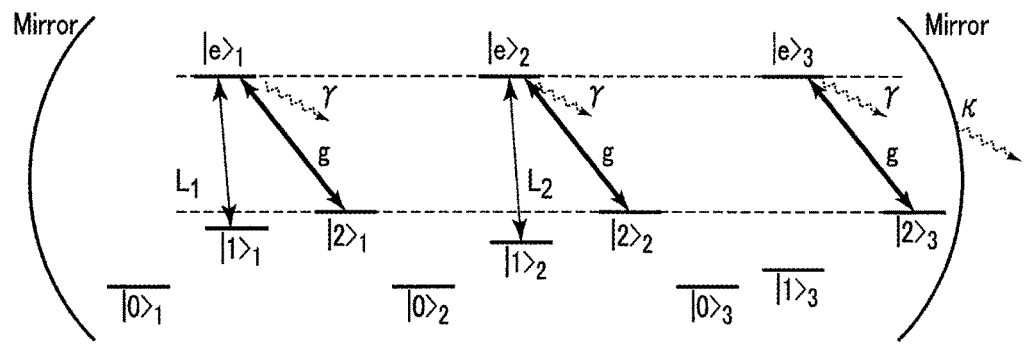
FIG. 1 is a diagram illustrating a frequency domain quantum computation.

According to an embodiment, a quantum computer includes a plurality of first physical systems, a second physical system, and a light source unit. The plurality of first physical systems are provided in a cavity, the plurality of first physical systems having three or more energy levels including two energy levels used for a qubit, the plurality of first physical systems including a transition coupled to a common cavity mode of the cavity. The second physical system is provided in the cavity, the second physical system having three or more energy levels, the second physical system including a first transition coupled to the common cavity mode and a second transition different from the first transition. The light source unit is configured to generate a first laser light beam and a second laser light beam to manipulate two of the plurality of first physical systems. The light source unit is further configured to generate a third laser light beam that resonates with the second transition. The third laser light beam is radiated to the second physical system during a period when the first laser light beam and the second laser light beam are simultaneously radiated to the two first physical systems.

Hereinafter, embodiments will be described with reference to the drawings. In the embodiments described below, like elements are denoted by like reference numerals, and duplicated descriptions are appropriately omitted.

First, a "frequency domain quantum computation" and a "resonance condition" will be described; the resonance condition is a condition under which a gate error inherent in the frequency domain quantum computation occurs. Subsequently, a "method for controlling the resonance condition" will be described.

[Frequency Domain Quantum Computation]

In a frequency domain quantum computation, a plurality of physical systems which are provided in an optical cavity (also called an optical resonator) and each of which includes a transition coupled to a common cavity mode and another transition whose frequency varies with the physical system are used as qubits. As the physical systems, ions or atoms may be utilized. The frequency domain quantum computation is performed by irradiating each physical system with laser light that resonates with a transition frequency of the physical system to selectively manipulate the physical system.

In the following description, N four-level systems $X_1, X_2, \ldots X_N$ are used as physical systems, where N is an integer of two or more. The physical systems are not limited to four-level systems. Any physical system may be used as long as the physical system has three or more energy levels. Each four-level system $X_i$ has four states, where i is an integer of one or more and N or less. These four states are expressed as $|0\rangle_i, |1\rangle_i, |2\rangle_i$, and $|e\rangle_i$ in order of increasing energy. The suffix i added to each state identifies the four-level system $X_i$ having the state. The suffix i may be omitted below. The states $|0\rangle_i$ and $|1\rangle_i$ are used for a qubit. In other words, the qubit can be expressed by the superposition state of the states $|0\rangle_i$ and $|1\rangle_i$. The state $|2\rangle_i$ is used to assist a gate operation. The state $|e\rangle_i$ that is an excited state is a state having higher energy than the states $|0\rangle_i, |1\rangle_i$, and $|2\rangle_i$. A $|2\rangle_i$–$|e\rangle_i$ transition (a transition between the state $|2\rangle_i$ and a state $|e\rangle_i$) is a transition that resonates with a common cavity mode. The frequency of a $|1\rangle_i$–$|e\rangle_i$ transition varies with the four-level systems $X_1, X_2, \ldots X_N$.

FIG. 1 depicts a physical system used for a frequency domain quantum computation for N=3. As depicted in FIG. 1, the physical systems $X_1, X_2$, and $X_3$ are coupled to the common cavity mode. Specifically, a $|2\rangle_1$–$|e\rangle_1$ transition, a $|2\rangle_2$–$|e\rangle_2$ transition, and a $|2\rangle_3$–$|e\rangle_3$ transition are coupled to the common cavity mode. Frequencies of a $|1\rangle_1$–$|e\rangle_1$ transition, a $|1\rangle_2$–$|e\rangle_2$ transition, and a $|1\rangle_3$–$|e\rangle_3$ transition are different from each other.

In the system depicted in FIG. 1, when the states of the two four-level systems $X_1$ and $X_2$ are manipulated, the four-level systems $X_1, X_2, \ldots X_N$ are entirely irradiated with operation light $L_1$ resonating with the $|1\rangle_1$–$|e\rangle_1$ transition and operation light $L_2$ resonating with the $|1\rangle_2$–$|e\rangle_2$ transition. Irradiation with the operation light ideally allows the states of the four-level systems $X_1$ and $X_2$ to be selectively manipulated. As a state manipulation method for a quantum gate, a method of an adiabatic passage via a cavity is known. In this method, if, for example, the state of the four-level system $X_1$ is manipulated from the initial state $|1\rangle_1$ to the state $|2\rangle_1$ and the state of the four-level system $X_2$ is manipulated from the initial state $|2\rangle_2$ to the state $|1\rangle_2$, the intensities of operation light $L_1$ and $L_2$ are controlled such that Rabi frequencies $\Omega_1$ and $\Omega_2$ of the operation light $L_1$ and $L_2$ follow Expression (1) under the condition that $\tau_1 > \tau_2$.

$$\Omega_1(t) = \Omega_0 \exp\left[-\frac{(t-\tau_1)^2}{2\sigma}\right] \quad (1)$$

$$\Omega_2(t) = \Omega_0 \exp\left[-\frac{(t-\tau_2)^2}{2\sigma}\right]$$

[Resonance Condition]

Figure 2:
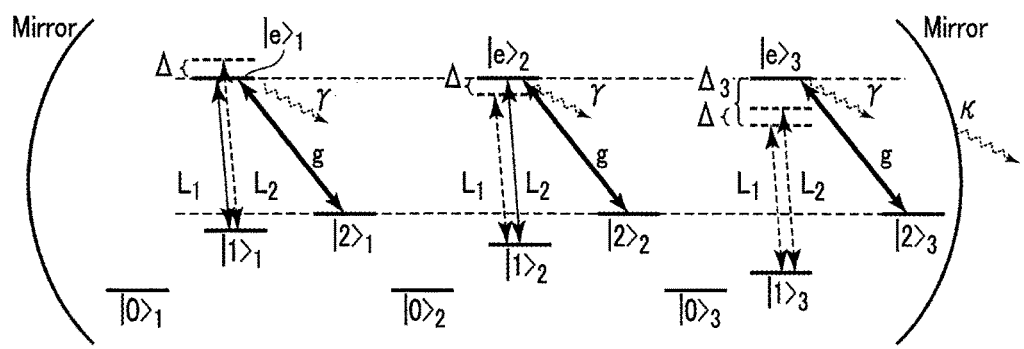
FIG. 2 is a diagram illustrating undesired interactions between physical systems used for the frequency domain quantum computation.

In the frequency domain quantum computation, to be exact, an "undesired interaction" occurs as described below. Since the four-level systems are not distinguished from one another based on their positions, operation light with detuning may act on four-level systems not intended to be manipulated, leading to the undesired interaction. For example, the undesired interaction has interactions of the four-level systems $X_2, X_3, \ldots X_N$ with the operation light $L_1$ and interactions of the four-level systems $X_1, X_3, \ldots X_N$ with the operation light $L_2$. FIG. 2 depicts a physical system including an undesired interaction for N=3. In FIG. 2, solid bidirectional arrows joining the state $|1\rangle_i$ and the state $|e\rangle_i$ together represent needed interactions. Dashed bidirectional arrows represent undesired interactions. Thick solid bidirectional arrows joining the state $|2\rangle_i$ and the state $|e\rangle_i$ together represent a cavity mode.

When the difference in frequency between the $|1\rangle_i$–$|e\rangle_i$ transitions of the four-level systems is very large, the adverse effect of the undesired interaction is very insignificant. However, in general, the frequencies of the transitions are distributed in a finite frequency region, and thus, transitions involving a minimized difference in frequency are used in order to utilize more qubits. Thus, the quantum gate can desirably be efficiently performed even with a small frequency difference.

The nature of the undesired interactions will be described in detail. Expression (2) represents a Hamiltonian describing a physical system for a frequency domain quantum computation including an undesired interaction as depicted in FIG. 2.

$$H(t)/\hbar = \sum_{i=1}^{N}\left[\sum_{j=0,1,2,e}\omega_j^{(i)}\sigma_{jj}^{(i)} - i\gamma\sigma_{ee}^{(i)}\right] + [2\pi f_g a^\dagger a - i\kappa a^\dagger a] + \sum_{i=1}^{N}[ga\sigma_{e2}^{(i)} + \Omega_1(t)e^{-i2\pi f_1 t}\sigma_{e1}^{(i)} + \Omega_2(t)e^{-i2\pi f_2 t}\sigma_{e1}^{(i)} + H.c.] \quad (2)$$

In Expression (2), $\sigma_{ab}^{(i)}$ is an operator that makes a state $|b\rangle_i$ of a four-level system $X_i$ transition to a state $|a\rangle_i$, a and $a^\dagger$ are an annihilation operator and a creator operator for a cavity mode, respectively. In Expression (2), g is a coupling constant between the cavity mode and the physical system, $\gamma$ is a relaxation rate for a transition, $\kappa$ is a damping factor for the cavity, and H.c. denotes a Hermitian conjugate.

Terms of the Hamiltonian will be described. The first term is an energy term for each state of each ion and an energy relaxation term for each ion. The second term is an energy term and a cavity relaxation term for the cavity mode. An ideal strong coupling system is hereinafter assumed, and a case of $\gamma=\kappa=0$ will be described. The third term is an interaction term and represents an interaction between the cavity mode and the $|2\rangle_i$–$|e\rangle_i$ transition of each four-level system $X_i$, an interaction between the operation light $L_1$ and the $|1\rangle_i$–$|e\rangle_i$ transition of each four-level system, and an interaction between the operation light $L_2$ and the $|1\rangle_i$–$|e\rangle_i$ transition of each four-level system.

Interaction Hamiltonian in the Hamiltonian in Expression (2) is represented as Expression (4) by using $H_0$ illustrated in Expression (3).

$$H_0/\hbar \equiv \sum_{i=1}^{N}\left[\sum_{j=0,1,2,e}(\omega_j^{(i)}\sigma_{jj}^{(i)})\right] + 2\pi f_g a^\dagger a \quad (3)$$

$$H'(t)/\hbar = \exp[iH_0 t/\hbar](H/\hbar - H_0/\hbar)\exp[-iH_0 t/\hbar] \quad (4)$$

$$= \sum_{i=1}^{N}ga\sigma_{e2}^{(i)} + \Omega_1(t)\left\{\sigma_{e1}^{(1)} + e^{-i\Delta t}\sigma_{e1}^{(2)} + \sum_{j=3}^{N}e^{i\Delta_j t}\sigma_{e1}^{(j)}\right\} +$$

$$\Omega_2(t)\left\{e^{i\Delta t}\sigma_{e1}^{(1)} + \sigma_{e1}^{(2)} + \sum_{j=3}^{N}e^{i(\Delta+\Delta_j)t}\sigma_{e1}^{(j)}\right\} + H.c.$$

In this case, Expression (4) uses the following relations.

$(\omega_e^{(1)}-\omega_1^{(1)})-2\pi f_1=0, (\omega_e^{(1)}-\omega_1^{(1)})-2\pi f_2=\Delta, (\omega_e^{(2)}-\omega_1^{(2)})-2\pi f_1=-\Delta,$ $(\omega_e^{(2)}-\omega_1^{(2)})-2\pi f_2=0, (\omega_e^{(j)}-\omega_1^{(j)})-2\pi f_1=\Delta_j, (\omega_e^{(j)}-\omega_1^{(j)})-2\pi f_2=-\Delta_j,$ $(\omega_e^{(i)}-\omega_1^{(i)})-2\pi f_g=0$, for $i=1,2,\ldots,N$ and $j=3,4,\ldots,N$.

$\Delta$ is a frequency difference between the $|e\rangle_1$–$|1\rangle_1$ transition and the $|e\rangle_2$–$|1\rangle_2$ transition, and $\Delta_j$ is a frequency difference between the $|e\rangle_1$–$|1\rangle_1$ transition and the $|e\rangle_j$–$|1\rangle_j$ transition.

The interaction Hamiltonian H' in Expression (4) is separated into a needed interaction $H_1$ and an undesired interaction V as represented by Expression (5).

$$H'(t) = H_1(t) + V(t) \quad (5)$$

$$\begin{cases} H_1(t)/\hbar = \sum_{i=1}^{N}ga\sigma_{e2}^{(i)} + \Omega_1(t)\sigma_{e1}^{(1)} + \Omega_2(t)\sigma_{e1}^{(2)} + H.c. \\ V(t)/\hbar = \Omega_1(t)\left\{e^{-i\Delta t}\sigma_{e1}^{(2)} + \sum_{j=3}^{N}e^{i\Delta_j t}\sigma_{e1}^{(j)}\right\} + \Omega_2(t)\left\{e^{i\Delta t}\sigma_{e1}^{(1)} + \sigma_{e1}^{(2)} + \sum_{j=3}^{N}e^{i(\Delta+\Delta_j)t}\sigma_{e1}^{(j)}\right\} + H.c. \end{cases}$$

In the adiabatic passage via the cavity, an error probability resulting from the undesired interaction is calculated by perturbation theory using Expression (5). An initial state $|\psi(0)\rangle$ is assumed to be a dark state $|\psi_0(0)\rangle$ that is one of eigenstates of $H_1$. The error probability for the adiabatic passage is the probability of a transition to another eigenstate $|\psi_n(t)\rangle$ ($n\neq 0$) at time t. To efficiently perform this manipulation, such operation light $L_1$ and $L_2$ as causes $\Omega_{1,2} \ll g$ is generally used. In such a case, V is smaller than $H_1$, and thus, time evolution can be calculated by a perturbation theory for V as represented by Expression (6).

$$|\psi(t)\rangle = |\psi_0(t)\rangle + \sum_n C_n^{(1)}(t)|\psi_n\rangle + \sum_n C_n^{(2)}(t)|\psi_n\rangle + O(V^3) \quad (6)$$

$$\begin{cases} C_n^{(1)}(t) = \frac{1}{i\hbar} \int_0^t dt' e^{-(E_n-E_0)t'/i\hbar} \langle \psi_n | V(t') | \psi_0 \rangle \\ C_n^{(2)}(t) = \left(\frac{1}{i\hbar}\right)^2 \int_0^t dt' \int_0^{t'} dt'' e^{-(E_n-E_k)t'/i\hbar} e^{-(E_n-E_0)t''/i\hbar} \\ \qquad \langle \psi_n | V(t') | \psi_k \rangle \langle \psi_k | V(t'') | \psi_0 \rangle \end{cases}$$

In Expression (6), $E_n$ is an eigenvalue corresponding to the eigenstate $|\psi_n\rangle$ of $H_1$. The eigenvalue $E_n$ temporally changes only according to $\Omega_{1,2}$, and thus, for $\Omega_{1,2} \ll g$, the amount of change is sufficiently smaller than the absolute value. Therefore, when an exponent in each of exponential functions in coefficients $C_n^{(1)}$ and $C_n^{(2)}$ is zero, the error probability increases with decreasing effectiveness of the perturbation theory. Given a oscillation term in $V(t')$, a resonance condition represented by Expression (7) can be obtained from the first-order coefficient $C_n^{(1)}$ as a condition for an increase in the error probability of the adiabatic passage via the cavity.

$$(E_n - E_0)/\hbar = \pm\Delta, \pm\Delta_j, \pm(\Delta+\Delta_j) \quad (7)$$

Similarly, a resonance condition represented by Expression (8) is obtained from the second-order coefficient $C_n^{(2)}$.

$$\begin{cases} (E_n - E_0)/\hbar = \pm\Delta, \pm\Delta_j, \pm(\Delta+\Delta_j) \\ (E_n - E_k)/\hbar = \pm\Delta, \pm\Delta_j, \pm(\Delta+\Delta_j) \end{cases} \quad (8)$$

The resonance condition obtained from the second-order coefficient $C_n^{(2)}$ generally makes a smaller contribution than the resonance condition obtained from the first-order coefficient $C_n^{(1)}$. However, the contribution is increased when the plurality of conditions are simultaneously met. For the resonance condition in Expression (8), as a condition for simultaneously meeting the plurality of conditions, a condition represented by Expression (9) is obtained.

$$(E_n-E_0)/\hbar = \pm\Delta, \pm\Delta_j, \pm2\Delta, \pm2\Delta_j, \pm(\Delta-\Delta_j), \pm(2\Delta+\Delta_j), \pm(\Delta+2\Delta_j), \pm2(\Delta+\Delta_j) \quad (9)$$

where, $j=3, 4, \ldots N$.

An analytic solution for the resonance condition is obtained by determining the eigenvalue $E_n$ of $H_1$. When, given the case of $\Omega_{1,2} \ll g$, the term $Q_{1,2}$ for $H_1$ is set to zero, the eigenvalue $E_n$ can be determined by analogy based on well-known vacuum Rabi splitting. The number of four-level systems $X_i$ with a population in the state $|2\rangle_i$ or $|e\rangle_i$ is denoted by $N_2$. The number of four-level systems $X_i$ with a population in the state $|e\rangle_i$ is denoted by $n_e$. The number of photons in the cavity mode is denoted by $n_c$. The eigenvalues of $H_1$ can be classified by specifying the total number of excitons $N_e$ ($N_e = n_e + n_c$) and the maximum value $n_e|_{max}$. Some of the eigenvalues of $H_1$ are represented by Expression (10).

$$E_{1,N_2}/\hbar = \pm\sqrt{N_2}g \quad (N_e=1, n_e|_{max}=N_2)$$

$$E_{2,N_2}/\hbar = 0, \pm\sqrt{4N_2-2}g \quad (N_e=2, n_e|_{max}=N_2)$$

$$E_{2,N_2-1}/\hbar = \pm\sqrt{N_2-2}g \quad (N_e=2, n_e|_{max}=N_2-1) \quad (10)$$

The resonance condition under which undesired interactions increase can be analytically determined using Expressions (7), (9), and (10). This condition needs to be avoided in order to allow efficient execution of the adiabatic passage via the cavity, in other words, to allow efficient execution of the quantum gates in the frequency domain quantum computation.

[Control of the Resonance Condition]

As represented by Expression (10), the eigenvalue of $H_1$ changes according to the number $N_2$ of four-level systems $X_i$ with a population in the state $|2\rangle_i$ or $|e\rangle_i$. This means that the resonance condition can be controlled by the number of four-level systems $X_i$ with a probability amplitude in the transition coupled to the cavity. Such control is referred to as control based on addition of a transition coupled to the cavity.

For example, in a quantum computer utilizing three qubits, the adiabatic passage via the cavity is assumed to be performed such that initial states $|1\rangle_1$, $|2\rangle_2$, and $|1\rangle_3$ change to final states $|2\rangle_1$, $|1\rangle_2$, and $|1\rangle_3$. In this manipulation, $N_2=2$ for $N_e=1$ and $N_2=3$ for $N_e=2$. Therefore, the eigenvalue of $H_1$ is obtained using Expression (10) as represented by Expression (11). The resonance condition is obtained from Expressions (7) and (9) by using the eigenvalue represented by Expression (11)

$$E_{1,2} = \pm\sqrt{2}g$$

$$E_{2,3} = 0, \pm\sqrt{10}g$$

$$E_{2,2} = \pm g \quad (11)$$

In contrast, when three physical systems are further added which have a transition probability in the transition coupled to the cavity, the eigenvalue of $H_1$ is obtained as represented by Expression (12).

$$E_{1,2} = \pm\sqrt{5}g$$

$$E_{2,3} = 0, \times\sqrt{22}g$$

$$E_{2,2} = \pm 2g \quad (12)$$

In this case, a region in which the resonance condition can be avoided significantly increase within a region where $|\Delta| \ll g$ and $|\Delta_j| \ll g$. Therefore, when a frequency distribution of the four-level system $X_i$ is stochastically given, the probability of allowing efficient performance of the quantum gate increases. Moreover, more qubits can be utilized.

When the resonance condition is thus controlled by adding the transition coupled to the common cavity mode, the undesired interaction can be suppressed, consequently allowing efficient frequency domain quantum computations.

During the manipulation, the desired state may transition to a different state with a slight probability, leading to an error. This is due to a change in the eigenstate of the system resulting from addition of the transition coupled to the cavity mode. For example, for a quantum computer that utilizes three qubits, when no physical system other than the qubits is available which has a transition coupled to the cavity mode, a state referred to as a dark state as represented by Expression (13) is included in the eigenstates of the system.

$$|\psi_0\rangle \propto g_1\Omega_2|1210\rangle + g_2\Omega_1|2110\rangle - \Omega_1\Omega_2|2211\rangle \quad (13)$$

In Expression (13), a state $|klmn\rangle$ is a state where the four-level system $X_1$ is in a state $|k\rangle$, the four-level system $X_2$ is in a state $|1\rangle$, the four-level system $X_3$ is in a state $|m\rangle$, and the cavity mode is in a state $|n\rangle$. The state $|\psi_0\rangle$ includes no excited state of the four-level system, and hence is referred to as the dark state. A change from the state $|1210\rangle$ to the state |2110> is effected by the adiabatic passage along the dark state. However, if any physical system other than the qubits is available which has a transition coupled to the cavity mode, all the eigenstates of the system include a state other than the three states included in Expression (13) and particularly include an excited state of a physical system other than the four-level systems or the qubits which has a transition coupled to the cavity. Such a difference in eigenstates causes a slight gate error when a physical system other than the qubits is available which has a transition coupled to the cavity mode.

Figure 3:
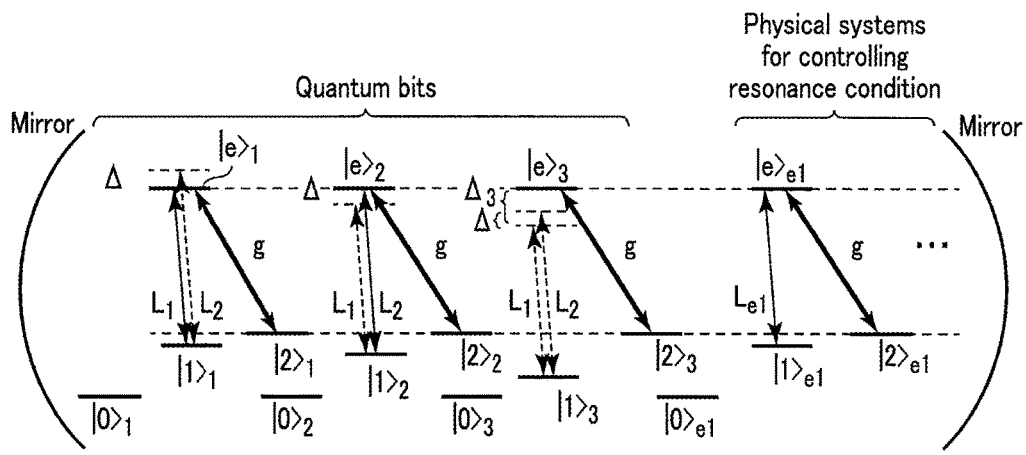
FIG. 3 is a diagram illustrating the physical systems used for the frequency domain quantum computation according to an embodiment.

A method for controlling the resonance condition according to the embodiment involves radiating operation light to a transition of a physical system which is different from the transition coupled to the cavity mode. For example, in a system into which three system four-level systems used for the qubits and one four-level system not used for the qubits but coupled to the common cavity mode are introduced, operation light is assumed to be radiated to two of the qubits which are to be manipulated and the operation light is assumed to be radiated to a transition not coupled to the cavity mode of the four-level system not used for the qubits as depicted in FIG. 3. The eigenstates of such a system include such states as represented by Expression (14).

$$|\psi_0\rangle \propto g_1 \Omega_2 \Omega_e |12120\rangle + \\ g_2 \Omega_1 \Omega_e |21120\rangle + \\ g_e \Omega_1 \Omega_2 |22110\rangle - \Omega_1 \Omega_2 \Omega_e |22121\rangle \quad (14)$$

In Expression (14), a state |jklmn> is a state where the four-level system $X_1$ is in a state |j>, the four-level system $X_2$ is in the state |k>, the four-level system $X_3$ is in the state |l>, the four-level system not used for the qubits is in the state |m>, and the cavity mode is in the state |n>. $\Omega_e$ is a Rabi frequency of operation light acting on the four-level system not used for the qubits. The eigenstate represented by Expression (14) is a dark state having no excited state of the four-level system. When $g_1$, $g_2$, $g_e$, and $\Omega_e$ are constant, the use of a Gaussian pulse for which $\Omega_1$ and $\Omega_2$ are as represented in Expression (1) changes the eigenstate from |12120> to |21120>. Therefore, the adiabatic passage along such an eigenstate allows the quantum gate to be performed.

A condition for $\Omega_e$ that allows the quantum gate to be efficiently performed will be described. When $\Omega_e$ is very small compared to $\Omega_1$ and $\Omega_2$, the population in |22110>, which is an undesired state, increases, precluding efficient a quantum gate from being performed. Thus, preferably, the operation light is controlled such that $\Omega_e \geq \Omega_1/2$ and $\Omega_e \geq \Omega_2/2$. The entire Hamiltonian includes an eigenstate depending on the value of $\Omega_e$. When $\Omega_e$ is smaller than $\sqrt{\Omega_1^2+\Omega_2^2}$, the eigenvalue depending on $\Omega_e$ is the smallest of the eigenvalues other than the eigenvalue of the dark state, degrading an adiabatic condition that is a performance index for the adiabatic passage. Thus, preferably, the operation light is controlled such that $\Omega_e \geq \sqrt{\Omega_1^2+\Omega_2^2}$. Moreover, when the value of $\Omega_e$ is sufficiently larger than $\Omega_0$, the resonance condition of $\Delta=0$ corresponding to the eigenvalue depending on $\Omega_e$ is separated. Thus, preferably, the operation light is controlled such that $\Omega_e \geq 2\sqrt{\Omega_{10}^2+\Omega_{20}^2}$, where $\Omega_{10}$ is the maximum value of the Rabi frequency $\Omega_1$, and $\Omega_{20}$ is the maximum value of the Rabi frequency $\Omega_2$. For example, for $\Omega_e = \Omega_{10} = \Omega_{20}$, the above-described conditions are satisfied, and a quantum gate can be implemented which is much more efficient than a quantum gate without supplemental operation light ($\Omega_e=0$).

Aside from this, when $\Omega_e$ is larger than $g_e$, the eigenvalue related to $g_e$ varies significantly according to $\Omega_e$. Consequently, the resonance condition related to $g_e$ can be controlled by the value of $\Omega_e$.

Figure 4:
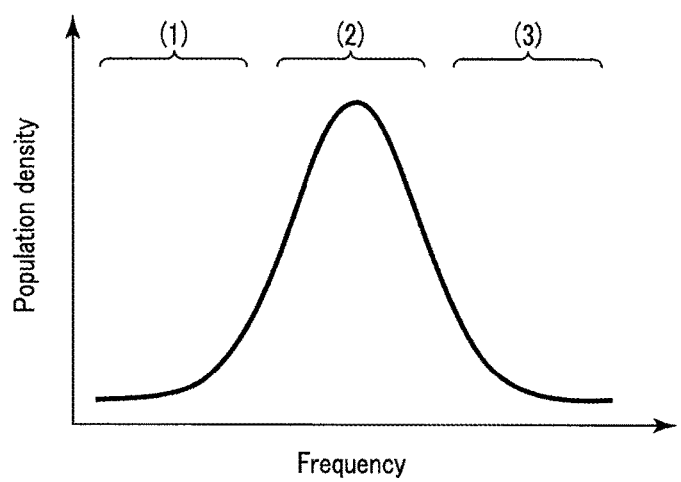
FIG. 4 is a diagram illustrating an example of a frequency distribution for the physical systems.

The physical system for controlling the resonance condition need not be distinguished based on a resonant frequency. Thus, utilizing those of the physical systems having such a frequency distribution as depicted in FIG. 4 which are included in a region (2) and which are difficult to distinguish from the other physical systems based on the frequency, the resonance condition can be controlled without consuming the physical systems that can be utilized for the qubits. FIG. 4 depicts an example of the frequency distribution for the physical systems. Specifically, FIG. 4 illustrates a population density with respect to the frequency (for example, the frequency of the |1>–|e> transition). The physical systems distributed in a region (2) with a high population density have a smaller difference in the frequency of the transition among the physical systems and a lower possibility of the presence of transitions with the same resonant frequency than the physical systems distributed in a region (1) or (3) with a low population density. Thus, the physical systems distributed in the region (2) are difficult to utilize as qubits. However, the physical systems introduced to control the resonance condition need not distinguish the resonant frequencies of the physical systems from one another, and can thus be selected from the physical systems in the region (2). In this manner, the physical systems for controlling the resonance condition are selected from the physical systems included in the region (2) to allow the control of the resonance condition and the use of more qubits without consumption of the physical systems included in the regions (1) and (3). As described above, when the physical systems used for the qubits and the physical systems for controlling the resonance condition are selected, the difference in resonant frequency among the physical systems used for the qubits may be higher than the Rabi frequencies $\Omega_1$ and $\Omega_2$, and the difference in resonant frequency among the physical systems for controlling the resonance condition may be lower than the Rabi frequency $\Omega_e$.

The above-described example is illustrative, and efficient quantum gates can be executed with the resonance condition controlled by changing the number of transitions coupled to the cavity so as to allow a resonance condition to be avoided or adjusting the intensity of the operation light and thus the value of $\Omega_e$, for the frequency distribution for the actually given physical systems.

A quantum computer according to an embodiment will be described below.

Figure 5:
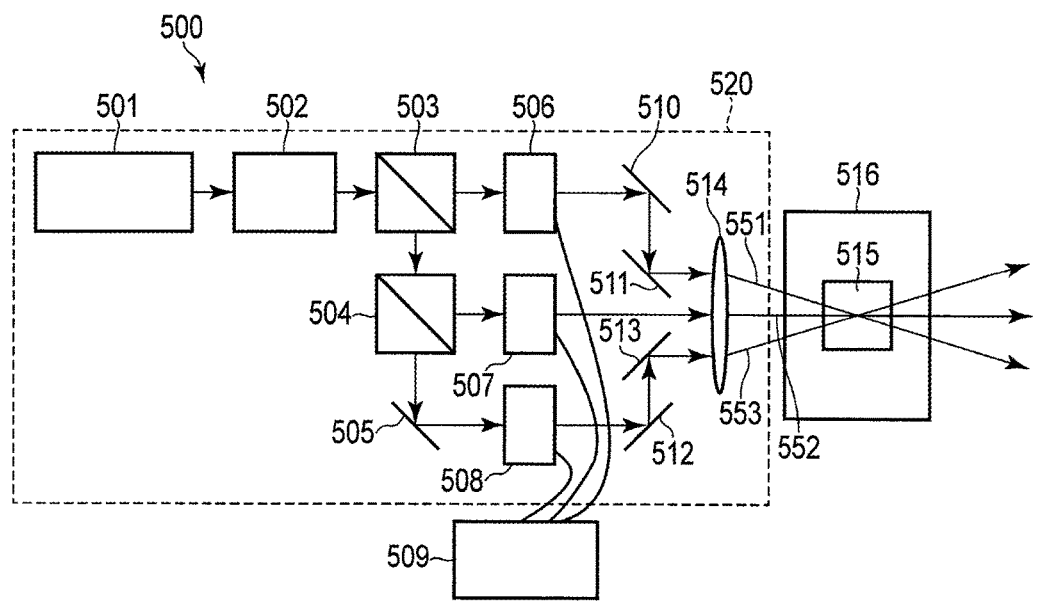
FIG. 5 is a diagram illustrating a quantum computer according to the embodiment.

FIG. 5 schematically depicts a quantum computer 500 according to an embodiment. In this embodiment, $Pr^{3+}$ ions doped into a $Y_2SiO_5$ crystal are used as specific physical systems that are considered to be four-level systems $X_i$. The quantum computer 500 includes a sample 515 processed into a cavity by arranging dielectric multilayer mirrors on side surfaces of a $Pr^{3+}$-ion doped $Y_2SiO_5$ crystal (Pr:YSO) as depicted in FIG. 5. The sample 515 is placed in a cryostat 516 and kept at a low temperature (for example, 4K).

In the following description, six $Pr^{3+}$ ions are used for a frequency domain quantum computation, and three of these $Pr^{3+}$ ions are used as qubits. The three $Pr^{3+}$ ions used as qubits are represented as ions $X_1$, $X_2$, and $X_3$, and the remaining three $Pr^{3+}$ ions are ions $Y_1$, $Y_2$, and $Y_3$. The ions $Y_1$, $Y_2$, and $Y_3$ are used to control the resonance condition. For example, the ions $X_1$, $X_2$, and $X_3$ are selected from $Pr^{3+}$ ions distributed in the regions (1) and (3) depicted in FIG.

4. The ions $Y_1$, $Y_2$, and $Y_3$ are selected from $Pr^{3+}$ ions distributed in the region (2) depicted in FIG. 4.

Each of the ions $X_1$, $X_2$, $X_3$, $Y_1$, $Y_2$, and $Y_3$ includes states |0>, |1>, |2>, and |e> in order of increasing energy. A |2>–|e> transition is coupled to the common cavity mode of the cavity. For each of the ions $X_1$, $X_2$, and $X_3$, the states |0> and |1> are used for the qubit, and the state |2> is used to assist a gate operation.

Figure 6:
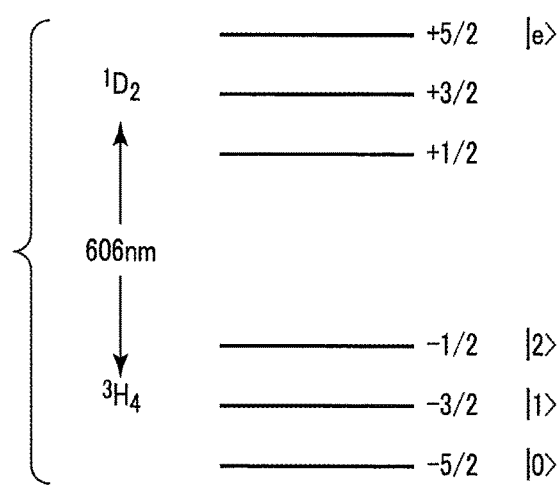
FIG. 6 is a diagram illustrating some of energy levels of $Pr^{3+}$ ions in a $Y_2SiO_5$ crystal utilized in the embodiment.

FIG. 6 depicts some of the energy levels of the $Pr^{3+}$ ions in the $Y_2SiO_5$ crystal. Specifically, FIG. 6 depicts three states of hyperfine structure levels in a ground state $^3H_4$ (states with nuclear spins of –1/2, –3/2, and –5/2) and three states of hyperfine structure levels in an excited state $^1D_2$ (states with nuclear spins of +1/2, +3/2, and +5/2). A wavelength corresponding to a transition frequency between the excited state $^1D_2$ and the ground state $^3H_4$ is approximately 606 nm. The states of the ground state $^3H_4$ having nuclear spins of –5/2, –3/2, and –1/2 correspond to the states |0>, |1>, and |2>, respectively. One of the states of the hyperfine structure levels in the excited state $^1D_2$ which has a nuclear spin of +5/2 corresponds to the state |e>. In this case, a |0>–|e> transition, a |1>–|e> transition, and a |2>–|e> transition are optically viable, whereas a |0>–|1> transition, a |0>–|2> transition, and a |1>–|2> transition are optically forbidden.

In the example described in this embodiment, the type of the physical systems used to control the resonance state is the same as the type of the physical systems used for the qubits. However, the type of the physical systems used to control the resonance state may be different from the type of the physical systems used for the qubits.

In the quantum computer 500 depicted in FIG. 5, a ring dye laser 502 excited by an argon ion laser 501 is used as a light source. Laser light emitted by the ring dye laser 502 is split into three laser light beams by two beam splitters 503 and 504. The three laser light beams are directed to acousto-optic modulators 506, 507, and 508, respectively. Specifically, the beam splitter 503 splits the laser light from the ring dye laser 502 into two laser light beams. One of the laser light beams enters the acousto-optic modulator 506, and the other laser light beam enters the beam splitter 504. The beam splitter 504 splits the incident laser light into two laser light beams. One of the laser light beams enters the acousto-optic modulator 507, and the other laser light beam is reflected by a mirror 505 and then enters the acousto-optic modulator 508.

In accordance with a control signal generated by a control apparatus 509, the acousto-optic modulators 506, 507, and 508 modulate the incident laser light beams to generate modulated laser light beams 551, 552, and 553, respectively. The modulated laser light beam 551 is directed to the sample 515 by mirrors 510 and 511 and a lens 514. The modulated laser light beam 552 is directed to the sample 515 by the lens 514. The modulated laser light beam 553 is directed to the sample 515 by mirrors 512 and 513 and the lens 514. In this embodiment, a light source unit 520 includes the argon ion laser 501, the ring dye laser 502, the beam splitters 503 and 504, the mirror 505, the acousto-optic modulators 506 to 508, the mirrors 510 to 513, and the lens 514.

A method for manipulating the qubits of the ions $X_1$ and $X_2$ will be specifically described. First, the light source unit 520 irradiates the sample 515 with the modulated laser light beam 553 such that, for the ions $Y_1$, $Y_2$, and $Y_3$, the population concentrates in the state |2> in the |2>–|e> transition (step S701 in FIG. 7). Specifically, the acousto-optic modulator 508 modulates the incident laser light beam such that the modulated laser light beam 553 resonates with the |0>–|e> transition or the |1>–|e> transition.

Figure 7:
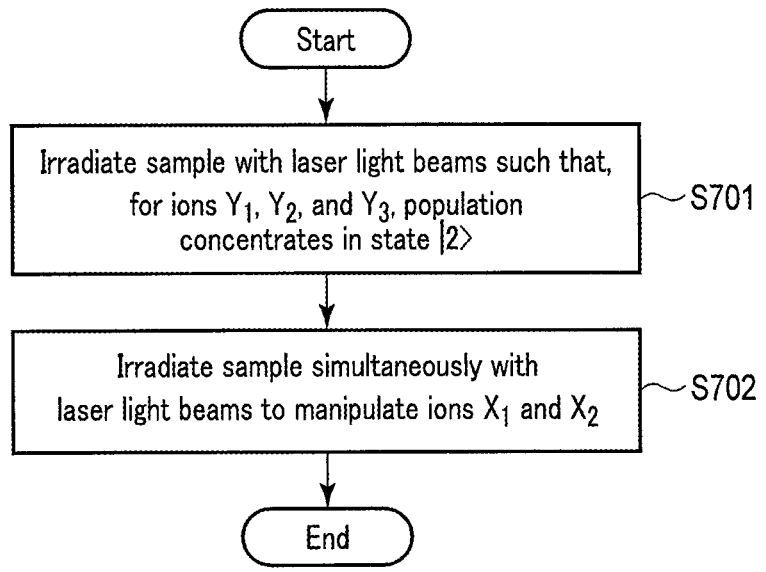
FIG. 7 is a flowchart illustrating a method for manipulating two physical systems according to the embodiment.

Subsequently, while radiating the modulated laser light beam 553, the light source unit 520 simultaneously irradiates the sample 515 with the modulated laser light beams 551 and 552, which allow the ions $X_1$ and $X_2$ to be manipulated (step S702 in FIG. 7). In this case, the simultaneous irradiation means that irradiation durations of the modulated laser light beams 551 and 552 at least partly overlap. That is, the modulated laser light beam 553 is radiated to the ions $Y_1$, $Y_2$, and $Y_3$ during manipulation of the ions $X_1$ and $X_2$, specifically, while the modulated laser light beams 551 and 552 are being simultaneously radiated to the ions $X_1$ and $X_2$.

Figure 8:
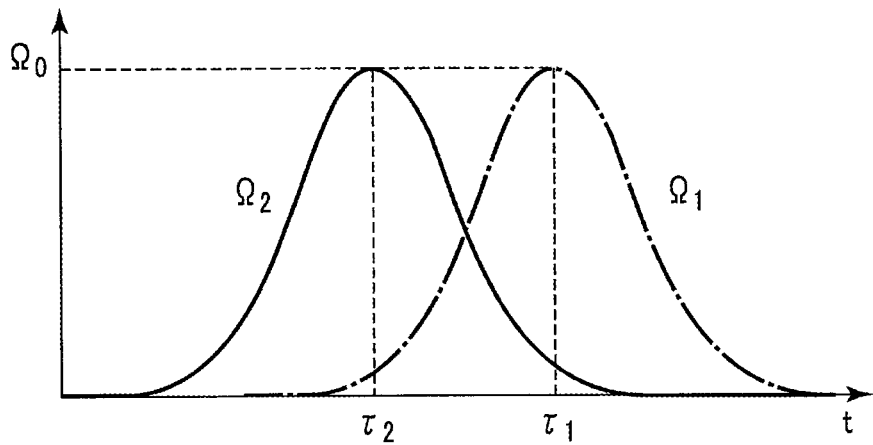
FIG. 8 is a diagram depicting a pulse waveform used for an adiabatic passage via a cavity according to the embodiment.

For example, the acousto-optic modulator 506 modulates the incident laser light beam such that the Rabi frequency $\Omega_1$ of the modulated laser light beam 551 changes in accordance with Expression (1). The acousto-optic modulator 507 modulates the incident laser light beam such that the Rabi frequency $\Omega_2$ of the modulated laser light beam 552 changes in accordance with Expression (1). To manipulate the states of the ions $X_1$ and $X_2$ from an initial state $|1>_1|2>_2$ to a state $|2>_1|1>_2$, $\tau_1 > \tau_2$ is set. FIG. 8 illustrates temporal changes in the Rabi frequencies $\Omega_1$ and $\Omega_2$ observed when the states of the ions $X_1$ and $X_2$ change from the initial state $|1>_1|2>_2$ to the state $|2>_1|1>_2$. In FIG. 8, the transverse axis represents time, and the vertical axis represents the Rabi frequency. A waveform depicted by an alternate long and short dashed line represents the Rabi frequency $\Omega_1$. A waveform depicted by a solid line represents the Rabi frequency 12. For example, parameters for the Rabi frequencies $\Omega_1$ and $\Omega_2$ of the laser light beams 551 and 552 are set such that $\Omega_0=5$ kHz, $\tau_1=44.944$ ms, $\tau_2=55.056$ ms, and $\sigma=4$ ms. Moreover, the Rabi frequency of the laser light beam 553 applied to the |1>–|e> of the ion $Y_1$ during manipulation of the ions $X_1$ and $X_2$ is adjusted such that $\Omega_{e1}=5$ kHz. The Rabi frequency of the laser light beam 553 applied to the |1>–|e> of the ion $Y_2$ during manipulation of the ions $X_1$ and $X_2$ is adjusted such that $\Omega_{e2}=5$ kHz. The Rabi frequency of the laser light beam 553 applied to the |1>–|e> of the ion $Y_2$ during manipulation of the ions $X_1$ and $X_2$ is adjusted such that $\Omega_{e3}=5$ kHz. Alternatively, the laser light beams 553 may be adjusted such that $\Omega_{e1}=200$ kHz, $\Omega_{e2}=200$ kHz, and $\Omega_{e3}=200$ kHz.

The sample 515 is thus irradiated with the modulated laser light beams 551, 552, and 553 to allow the states of the ions $X_1$ and $X_2$ to be manipulated from the initial state $|1>_1|2>_2$ to a state $|2>_1|1>_2$ while avoiding the resonance condition without changing the state of the ion $X_3$ (for example, the state $|1>_3$).

As described above, the quantum computer according to the embodiment utilizes physical systems different from physical systems utilized for the qubits and including a transition coupled to the common cavity mode, to allow much more efficient quantum gates to be executed while suppressing undesired interactions.

Figure 9:
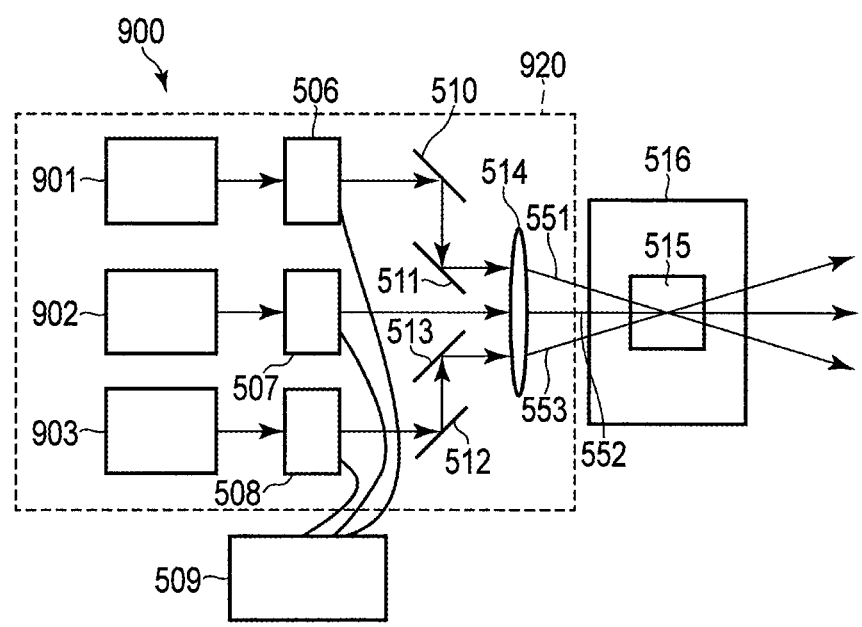
FIG. 9 is a diagram depicting a quantum computer according to an embodiment.

The light source unit is not limited to the exemplary light source unit with the one light source 501 as depicted in FIG. 5 but may comprise a plurality of light sources. FIG. 9 schematically depicts a quantum computer 900 according to an embodiment. As depicted in FIG. 9, the quantum computer 900 comprises semiconductor lasers 901, 902, and 903. Laser light beams emitted from the semiconductor lasers 901, 902, and 903 are directed toward the acousto-optic modulators 506, 507, and 508, respectively. Operations of the acousto-optic modulators 506, 507, and 508 and the like are similar to the above-described corresponding operations and will thus not be described. A light source unit 920 comprises the semiconductor lasers 901 to 903, the acousto-optic modulators 506 to 508, the mirrors 510 to 513, and the lens 514.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum computer comprising:
a plurality of first physical systems provided in a cavity, the plurality of first physical systems including a first energy level, a second energy level, a third energy level, and a fourth energy level which are different from each other, the first energy level and the second energy level being used for a qubit, the plurality of first physical systems including a first transition between the fourth energy level and the first energy level, a second transition between the fourth energy level and the second energy level, and a third transition between the fourth energy level and the third energy level, the third transition being coupled to a common cavity mode of the cavity;
a second physical system provided in the cavity, the second physical system including a fifth energy level, a sixth energy level, and a seventh energy level which are different from each other, the second physical system including a fourth transition between the seventh energy level and the fifth energy level, and a fifth transition between the seventh energy level and the sixth energy level, the fifth transition being coupled to the common cavity mode; and
a light source unit configured to simultaneously irradiate two of the plurality of first physical systems with a first laser light beam and a second laser light beam to manipulate the two first physical systems, the first laser light beam resonating with the second transition of one of the two physical systems, the second laser light beam resonating with the second transition of the other of the two physical systems, the light source unit being configured to continuously irradiate the second physical system with a third laser light beam over a period when the two first physical systems are irradiated with the first laser light beam and the second laser light beam, the third laser light beam resonating with the fourth transition of the second physical system.

2. The quantum computer according to claim 1, wherein the light source unit comprises a first modulator which modulates a fourth laser light beam to generate the first laser light beam, a second modulator which modulates a fifth laser light beam to generate the second laser light beam, and a third modulator which modulates a sixth laser light beam to generate the third laser light beam, and wherein the first modulator, the second modulator, and the third modulator are controlled to perform a quantum gate such that $\Omega_e \geq \Omega_1/2$ and $\Omega_e \geq \Omega_2/2$ are satisfied, where $\Omega_1$ denotes a Rabi frequency between the first laser light beam and a transition resonating with the first laser light beam, $\Omega_2$ denotes a Rabi frequency between the second laser light beam and a transition resonating with the second laser light beam, and $\Omega_e$ denotes a Rabi frequency between the third laser light beam and a transition resonating with the third laser light beam.

3. The quantum computer according to claim 2, wherein the third modulator is controlled to perform the quantum gate such that $\Omega_e \geq \sqrt{\Omega_1^2 + \Omega_2^2}$ is satisfied.

4. The quantum computer according to claim 3, wherein the third modulator is controlled to perform the quantum gate such that $\Omega_e \leq 2\sqrt{\Omega_{10}^2 + \Omega_{20}^2}$ is satisfied, where $\Omega_{10}$ denotes a maximum value of the Rabi frequency $\Omega_1$ in performing the quantum gate, and $\Omega_{20}$ denotes a maximum value of the Rabi frequency $\Omega_2$ in performing the quantum gate.

5. The quantum computer according to claim 1, the third modulator is controlled to perform a quantum gate such that $g_e \leq \Omega_e$ is satisfied, where $\Omega_e$ denotes a Rabi frequency between the third laser light beam and a transition resonating with the third laser light beam and $g_e$ denotes a coupling constant between the second physical system and the cavity mode.

6. The quantum computer according to claim 1, comprising a plurality of second physical systems, wherein a difference in resonant frequency between the plurality of first physical systems is larger than a Rabi frequency between the first laser light beam and a transition resonating with the first laser light beam and a Rabi frequency between the second laser light beam and a transition resonating with the second laser light beam, and a difference in resonant frequency between the plurality of second physical systems is smaller than a Rabi frequency between the third laser light beam and a transition resonating with the third laser light beam.

7. The quantum computer according to claim 1, wherein a frequency of the fourth transition is different from a frequency of the first transition of the one of the two physical systems, a frequency of the first transition of the other of the two physical systems, a frequency of the second transition of the one of the two physical systems, and a frequency of the second transition of the other of the two physical systems.

* * * * *